April 19, 1960 D. A. S. DRYBROUGH 2,933,599

NON-RADIATING AUTODYNE FREQUENCY CONVERTER

Original Filed March 27, 1956

United States Patent Office 2,933,599
Patented Apr. 19, 1960

2,933,599

NON-RADIATING AUTODYNE FREQUENCY CONVERTER

David A. S. Drybrough, Coventry, England, assignor to Hazeltine Research, Inc., Chicago, Ill., a corporation of Illinois Continuation of abandoned application Serial No. 574,151, March 27, 1956. This application June 25, 1958, Serial No. 744,384

Claims priority, application Great Britain April 5, 1955

1 Claim. (Cl. 250—20)

*General*

Figure 1:
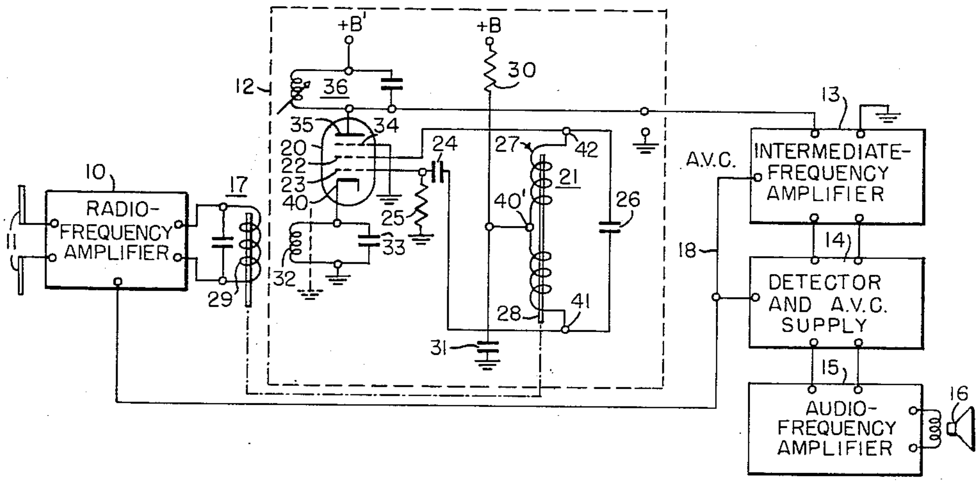

This invention relates to frequency changers or converters.

This application is a continuation of applicant's prior application, Serial No. 574,151, filed March 27, 1956.

The invention is concerned in particular with frequency changers of the kind comprising an electron-discharge device such as a pentode or tetrode valve connected in circuit to operate as a self-oscillatory mixer, the oscillations generated in the valve or tube being sustained by means of a tunable parallel-resonant circuit connected between the screen and control electrodes of the valve and having an intermediate point connected to the cathode of the valve by a path which is of low impedance at the oscillation frequency.

Where a frequency changer is used for high-frequency operation, for example where the oscillation frequency is of the order of 100 mc., difficulties may arise due to radiation at the oscillation frequency. In particular, where such a frequency changer is used as the first detector in a superheterodyne radio receiver, an appreciable voltage at the oscillation frequency may be fed back to the aerial through the radio-frequency circuits. Back radiation of energy at the oscillation frequency is undesirable since it creates interference which impairs the operation of nearby equipment. In view of the interest of the Federal Communications Commission in reducing such interference, radio and television manufacturers are continually seeking means for reducing the extent of such interference.

It is an object of the present invention to provide a new and improved frequency changer in which such difficulties are alleviated.

It is another object of the invention to provide a new and improved frequency changer which is particularly adapted for use at high frequencies such as those encountered in frequency-modulation broadcast receivers.

It is a further object of the invention to provide for use at high frequencies a new and improved frequency changer which avoids the need for neutralizing circuits.

It is an additional object of the present invention to provide a new and improved frequency changer which is relatively simple in construction and inexpensive to manufacture.

In accordance with the invention, a high-frequency wave-signal frequency changer having minimum back radiation comprises an electrical valve including a current-emitting electrode, at least one current-receiving electrode, and a control electrode interposed therebetween and an input circuit having a low impedance at the heterodyne-signal frequency and a beat frequency and including means coupled between the emitting electrode of the valve and a point of fixed high-frequency potential for applying therebetween a wave signal. The frequency changer also comprises a heterodyne tuned circuit coupled to a current-receiving electrode and to the control electrode of the valve through a path having a low impedance at the heterodyne frequency and having an intermediate terminal connected to the point of fixed potential through a path of low impedance at the heterodyne frequency and a beat-frequency tuned circuit coupled between the current-emitting and current-receiving electrodes of the valve.

For a better understanding of the present invention, together with other and further objects thereof, reference is had to the following description taken in connection with the accompanying drawing, and its scope will be pointed out in the appended claim.

Figure 2:
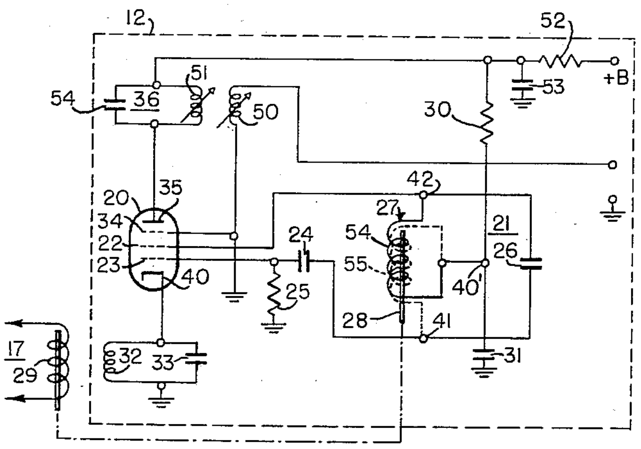

Referring to the drawing:

Fig. 1 is a circuit diagram, partly schematic, of a complete wave-signal receiver which includes a frequency changer in accordance with the present invention in a particular form; and Fig. 2 is a circuit diagram of a frequency converter in accordance with a modified form of the present invention.

*General description of Fig. 1 receiver*

Referring now more particularly to Fig. 1, there is represented a complete superheterodyne receiver which includes a radio-frequency amplifier 10 having its input circuit connected to an antenna 11 and its output circuit connected by way of the adjustably tuned primary winding 29 of a transformer 17 to a frequency changer or oscillator-modulator 12 in accordance with one form of the present invention. Connected in cascade with the frequency changer 12, in the order named, are an intermediate-frequency amplifier 13 of one or more stages, a detector and automatic-volume-control supply 14, an audio-frequency amplifier 15 of one or more stages, and a sound reproducer 16. The detector of unit 14 may be of any convenient form such as one for deriving either the modulation components of an amplitude-modulated wave signal or of a frequency-modulated wave signal. For the embodiment of the invention under consideration, however, unit 14 will be considered to include a detector for frequency-modulated wave signals. An automatic-amplification-control bias derived from the AVC supply of unit 14 is applied to the control electrodes of one or more of the tubes of radio-frequency amplifier 10 and one or more of the control electrodes of the intermediate-frequency amplifier 13 in order to maintain the signal input to the detector of unit 14 within a relatively narrow range for a wide range of received signal intensities. It will be understood that the various units just described, with the exception of the frequency converter 12, may be of conventional construction and operation, the details of which are well known in the art, rendering detailed description thereof unnecessary.

*General operation of receiver of Fig. 1*

Considering briefly the operation of the receiver as a whole but neglecting for the moment the details of the operation of the frequency converter 12, presently to be described, a desired received modulated wave signal is selected and amplified by the radio-frequency amplifier 10, converted to a modulated intermediate-frequency signal in the frequency changer 12, amplified by the intermediate-frequency amplifier 13, and rectified by the detector 14, thereby deriving the audio-frequency modulation components and the ABC bias potential. The modulation components last mentioned are, in turn, amplified in the audio-frequency amplifier 15 and are reproduced by the sound reproducer 16. The bias potential is employed as previously stated.

*Description of frequency changer 12 of Fig. 1*

One arrangement in accordance with the invention will now be described by way of example with reference to a frequency changer 12 when used as the first detector in a superheterodyne radio receiver for the reception of signals broadcast in the frequency band extending from 88 to 100 mc.

The frequency changer is arranged to convert the received signals, which are fed to it via the tunable winding 29 in the radio-frequency circuit, to a fixed intermediate frequency of 10.7 mc. The frequency changer includes an electron-discharge device such as as a pentode valve 20 arranged to operate as a self-oscillatory mixer, that is, as both a mixer and a local oscillator, the local oscillations being generated by means of a parallel-resonant feedback circuit 21 connected between the screen electrode 22 and control electrode 23 of the valve, the control electrode being biased negatively by means of the conventional capacitor grid-leak combination 24, 25. The parallel-resonant circuit 21 includes a fixed capacitor 26 and an inductor 27, the inductance of which is variable by movement of a ferromagnetic core 28 so as to tune the circuit, the tuning core of the oscillator circuit being ganged with a similar core in the tuned primary winding 29 of the radio-frequency circuit so that the local oscillation frequency is always 10.7 mc. above the frequency of the received signal. For best results a bifilar winding is utilizer for the inductor. The center point or first terminal 40′ of the inductor 27 is connected via a high value resistor 30 to the positive terminal of a constant voltage source indicated as +B whose negative terminal is earthed, that is, connected to a point of fixed reference potential. This first terminal is also connected to earth via a capacitor 31 whose impedance is low at at least one of the oscillation or heterodyne frequency and the intermediate or beat frequency. The second terminal 41 of the inductor 27 is connected to the contrdol electrode 23 through condenser 24 while the third terminal 42 is directly connected to the screen electrode 22.

The signal input circuit for the frequency changer presents a low impedance to heterodyne and beat-frequency wave signals and includes means coupled between the current-emitting electrode or cathode of tube 20 and ground for applying the radio-frequency signal therebetween. This last-mentioned means comprises an inductor 32 and a capacitor 33 connected in parallel between the cathode 40 of the pentode and earth, the inductor being tightly coupled to the inductor 29 of the transformer 17 in the tuned radio-frequency circuit to which the received signal is applied. The values of the inductor 32 and the capacitor 33 in the signal input circuit of the frequency changer are chosen so that this circuit resonates at a frequency of approximately 86 mc., the circuit having a low Q by virtue of the damping produced by the cathode input admittance of the pentode 20 and thus providing an adequate signal throughout the signal frequency band. The suppressor electrode 34 of the pentode is connected to earth, and the anode 35 of the pentode is connected via a circuit 36 tuned to the intermediate frequency to the positive terminal of the constant voltage source +B′.

*Explanation of operation of frequency changer 12 of Fig. 1*

In operation of the frequency changer 12, an input signal fed to the cathode of the pentode is, by virtue of the nonlinear operation of the valve, heterodyned with the oscillation produced in the pentode so that an intermediate-frequency signal appears at the control electrode 23 of the pentode; this signal is amplified by the pentode, good amplification being obtained by virtue of the fact that the screen electrode is virtually earthed at the intermediate frequency, and an intermediate-frequency output signal is derived from the anode 35 of the pentode.

In operation, the feedback circuit 21 connected between the screen and control grids of the pentode is substantially balanced with respect to earth; the bifilar winding of the inductor 27 in the feedback circuit ensures that the balanced condition of the circuit is maintained over the whole oscillator tuning range, since movement of the tuning core 28 does not affect the balance of the circuit. Furthermore, the impedance of the signal input circuit is always low (of the order of 100 ohms) throughout the normal frequency range of the local oscillation. By virtue of these two facts, the voltage generated across the signal input circuit at the local oscillation frequency is always of small amplitude, and thus relatively little power is fed back at the oscillation frequency to the radio-frequency circuit. Direct coupling between the other parts of the frequency changer circuit and the radio-frequency circuit is eliminated by means of the suppressor or shield electrode 34 serving as an earthed electrostatic screen disposed between the frequency changer and the radio-frequency circuit, the inductor 32 in the signal input circuit of the frequency changer being disposed on the same side of this screen as the radio-frequency circuit.

The use of the bifilar winding for the inductor 27 in the feedback circuit 21 also results in a tight coupling between the two halves of the inductor, so that the unidirectional potential applied to the screen electrode 22 may be made comparatively low while still maintaining oscillation, thus ensuring that the total power developed at the local oscillation frequency is relatively small and further reducing the risk of radiation at the oscillation frequency. Operation is further enhanced by the fact that the signal input circuit has a capacitative impedance at all frequencies within the normal frequency range of the local oscillation, thus tending to reduce the input admittance of the local oscillator and make it easier to maintain oscillation with a relatively low unidirectional potential applied to the screen electrode.

The use of a pentode in the frequency changer 12 has the advantage that the output impedance of the valve 20 is high, so that there is little damping of the intermediate-frequency output circuit 36, and there is also little back coupling through the valve at the intermediate frequency, thus removing the necessity for neutralization at this frequency.

From the foregoing description and explanation of the operation of the frequency changer 12 of Fig. 1, it will be clear that the pentode 20 comprises an electron-discharge device having a single space current path; that the cathode 40 thereof constitutes the current-emitting electrode; the screen electrode 22 constitutes a first current-receiving electrode; the suppressor electrode constitutes a shield electrode; and the anode constitutes a second current-receiving electrode. It will also be clear that the condensers 31 and 33 constitute means having a low impedance for the heterodyne and beat-frequency signals and serve to couple terminal 40′ to the cathode 40 of the pentode.

*Description of Fig. 2 frequency changer 12*

Referring now to Fig. 2, there is represented a frequency changer which is substantially the same as that of Fig. 1. Accordingly, corresponding elements are designated by the same reference numerals. The frequency changer of Fig. 2 differs from that of Fig. 1 only in the manner of making circuit connections to the anode and suppressor circuits of the pentode 20. The anode 35 is energized from a source +B connected to the anode through a resistor 52 in series with a winding 51 of the tuned circuit 36. Thus the anode 35 and the screen electrode 23 are energized from the same source but at different potential levels. The potential supplied to the screen electrode 22 is considerably lower than that applied to the anode of the pentode. In a practical embodiment of the invention, 170 volts were applied to the anode while but 50 volts were applied to the screen electrode. A by-pass condenser 53 is connected between the junction of the resistors 30 and 52 and ground. The suppressor electrode 34 of the pentode not only is grounded but is also connected to the output terminal of the frequency changer 12 through a winding 50 inductively coupled to the winding 51 in the anode circuit of the pentode. The bifilar winding comprising the inductor 27 has been represented as comprising a coil or winding portion 54 represented by the solid-line construction and another winding portion 55 represented by the broken-line construction. It will be noted that the portions of the bifilar winding are series connected with two opposite terminals of winding portions 54 and 55 connected to the first terminal 40, the remaining terminal of winding portion 55 being connected to the second terminal 41, and the remaining terminal of winding portion 54 being connected to the third terminal 42.

The operation of the frequency changer 12 of Fig. 2 is essentially the same as that of Fig. 1 and hence need not be repeated.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

A high-frequency wave-signal frequency changer having minimum back radiation comprising: an electrical valve including a current-emitting electrode, at least one current-receiving electrode, and a control electrode interposed therebetween; an input circuit having a low impedance at the heterodyne-signal frequency and a beat frequency and including means coupled between said emitting electrode and a point of fixed high-frequency potential for applying therebetween a wave signal; a heterodyne tuned circuit coupled to a current-receiving electrode and to said control electrode through a path having a low impedance at said heterodyne frequency, said tuned circuit including a two-part series-connected bifilar winding with the junction thereof connected to said point of fixed potential through a path of low impedance at said heterodyne frequency, said tuned circuit being electrically balanced with respect to said point of fixed potential; adjustable means cooperating with said winding to tune said tuned circuit over a range of frequencies without disturbing the balance thereof; and a beat-frequency tuned circuit coupled between said current-emitting and current-receiving electrodes.

References Cited in the file of this patent

UNITED STATES PATENTS

| | | |
|---|---|---|
| 2,107,393 | Schlesinger | Feb. 8, 1938 |
| 2,582,683 | Dammers | Jan. 15, 1952 |
| 2,662,171 | Cock | Dec. 8, 1953 |
| 2,789,213 | Marks | Apr. 16, 1957 |